(12) United States Patent
Amsler et al.

(10) Patent No.: US 6,398,513 B1
(45) Date of Patent: Jun. 4, 2002

(54) FLUID DISPENSERS

(75) Inventors: Thomas J. Amsler, Grayslake; Tim Hogan, Round Lake Beach; Margaret M. Lowan, West Chicago; James Martin, Arlington Heights; William A. Miller, Buffalo Grove, all of IL (US); Susan G. McDermott, Portland, OR (US); Jeffrey G. Barton; Charles F. Carr, both of Vancouver, WA (US)

(73) Assignees: Fluid Management, Inc., Wheeling, IL (US); MicroPump, Inc., Vancover, WA (US)

(*) Notice: Subject to any disclaimer, the term of this patent is extended or adjusted under 35 U.S.C. 154(b) by 0 days.

(21) Appl. No.: 09/665,695

(22) Filed: Sep. 20, 2000

(51) Int. Cl.$^7$ ................................ F04B 1/26; F04B 7/04
(52) U.S. Cl. ...................... 417/63; 417/222.1; 417/326; 417/490; 222/333
(58) Field of Search ...................... 417/63, 218, 222.1, 417/326, 490, 500; 222/333

(56) References Cited

U.S. PATENT DOCUMENTS

| | | | |
|---|---|---|---|
| 4,223,558 A | 9/1980 | Schmider et al. | 73/421 R |
| 4,323,097 A | 4/1982 | Achen | 141/168 |
| 4,941,809 A | 7/1990 | Pinkerton | 417/500 |
| 5,015,157 A | 5/1991 | Pinkerton et al. | 417/500 |
| 5,020,980 A | 6/1991 | Pinkerton | 417/500 |
| 5,044,889 A | 9/1991 | Pinkerton | 417/53 |
| 5,102,310 A * | 4/1992 | Gander et al. | 417/500 |
| 5,246,354 A | 9/1993 | Pardinas | 417/500 |
| 5,279,210 A | 1/1994 | Pinkerton | 92/170.1 |
| 5,482,448 A * | 1/1996 | Atwater et al. | 417/492 |
| 5,863,187 A * | 1/1999 | Bensley et al. | 417/218 |
| 6,224,347 B1 * | 5/2001 | Clark et al. | 417/222.1 |

FOREIGN PATENT DOCUMENTS

DE   3410302 A1   9/1985

OTHER PUBLICATIONS

Fluid Metering, Inc., "Valveless Dispensers & Metering Pumps 2000" catalog, date unknown.
International Search Report dated Jan. 2, 2002 (3 pages).

* cited by examiner

Primary Examiner—Charles G. Freay
(74) Attorney, Agent, or Firm—Marshall, Gerstein, & Borun.

(57) ABSTRACT

A fluid dispense system having a computer control system that operatively controls a stepper motor driving a nutating pump. The stepper motor actuates the nutating pump piston through partial revolutions. The computer control system determines the number of stepper motor steps required to pump a desired amount of fluid by the nutating pump by rotating the piston through segments which are less than a full revolution.

12 Claims, 3 Drawing Sheets

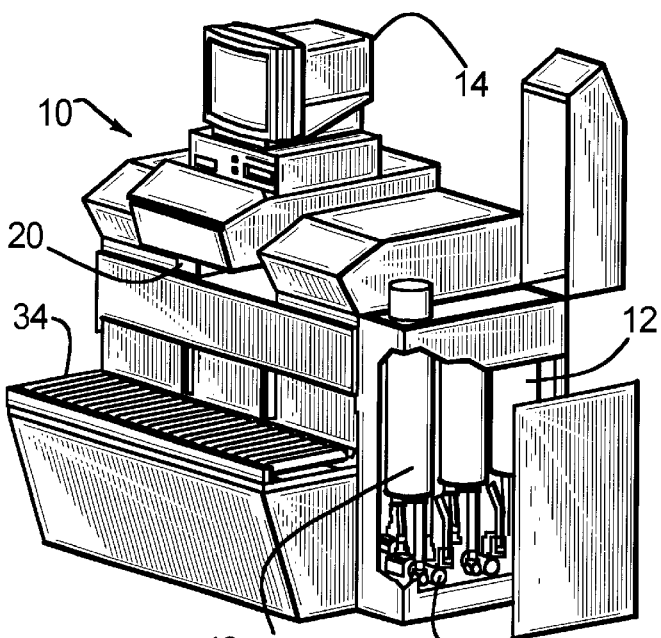
*FIG. 1*
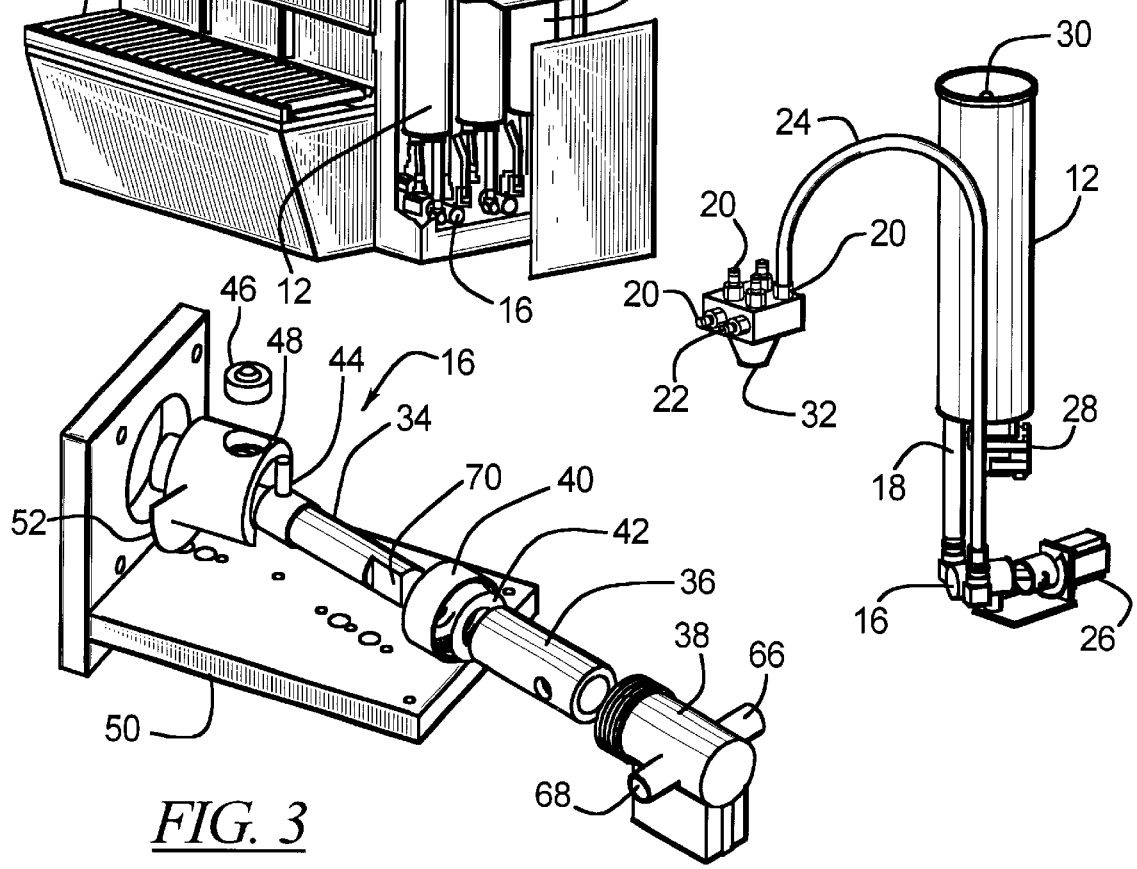
*FIG. 2*
*FIG. 3*
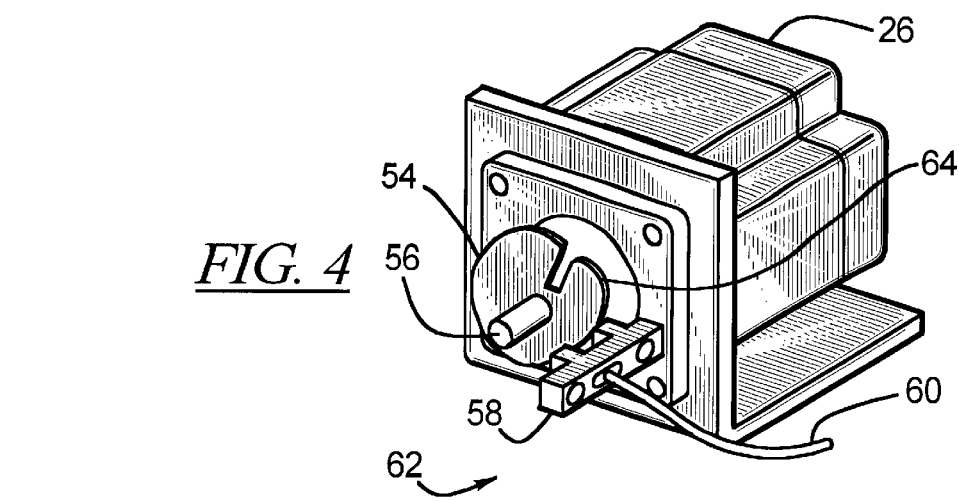
*FIG. 4*

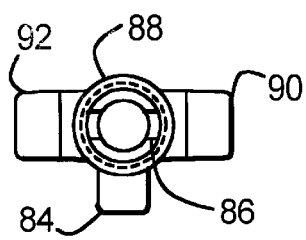
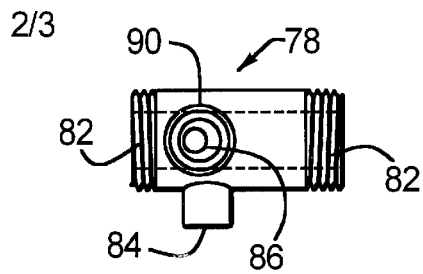
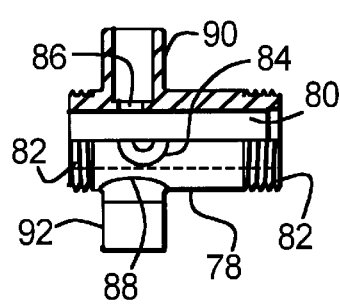
FIG. 12  FIG. 11  FIG. 10
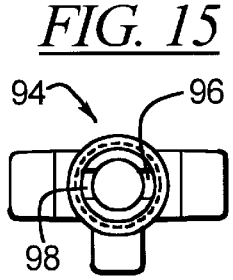
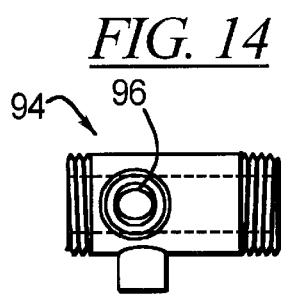
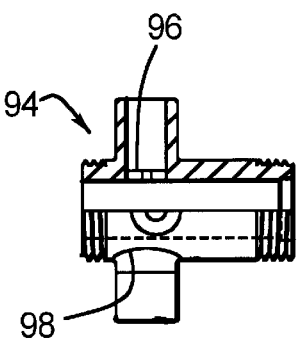
FIG. 15  FIG. 14  FIG. 13
FIG. 5
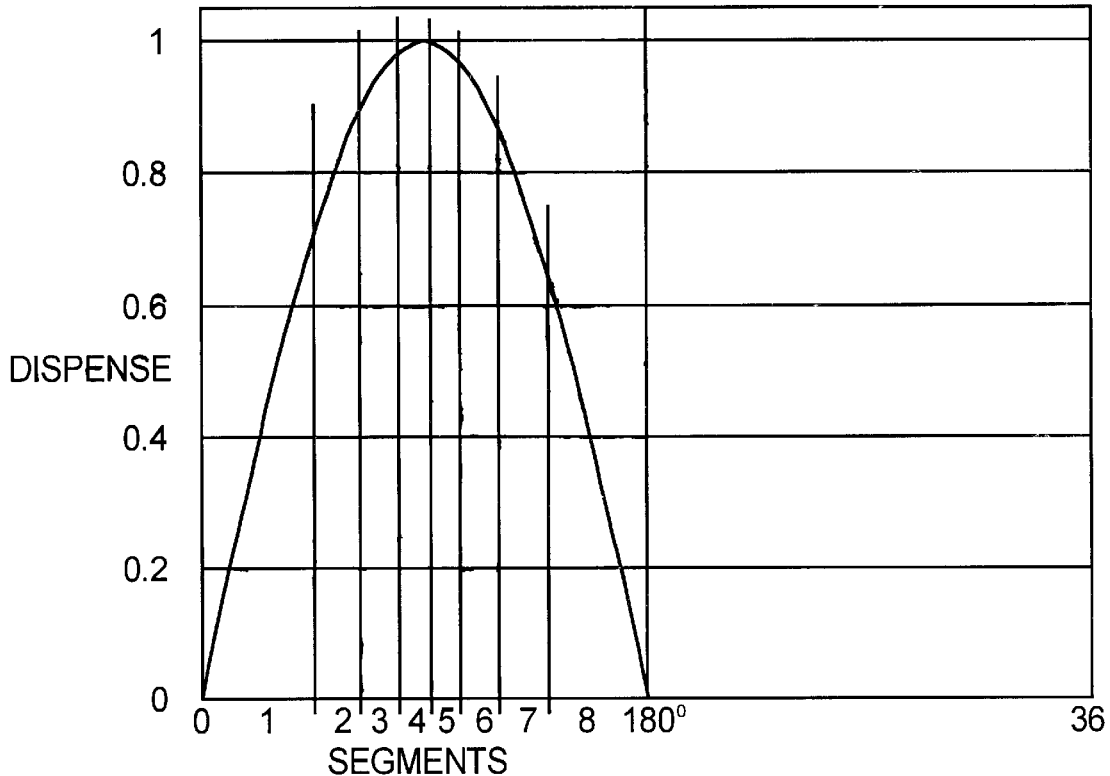

FLUID DISPENSERS

FIELD OF THE INVENTION

The present invention generally relates to fluid dispensers, and more specifically, the present invention relates to fluid dispensers which accurately control the amount of fluid dispensed. The present invention also relates to methods of dispensing fluid in a controlled manner. One specific example of a fluid dispenser according to the present invention is a paint colorant dispenser.

BACKGROUND OF THE INVENTION

Paints are made in a vast number of different colors and shades of colors. Each specific paint color has a specific formula of components to provide the desired color. A paint formula generally includes a relatively large amount of a base and smaller amounts of one or more colorant colors. Each colorant color is measured according to the formula and dispensed from a bulk colorant supply, added to the base, and then mixed to produce the desired paint color.

Existing colorant dispensers have been used in retail paint supply stores and hardware stores, for example. Existing colorant dispensing equipment has included manual and automated machines. Automated colorant dispensing equipment can include several bulk colorant containers, in which each colorant container is connected to an inlet of a fluid pump. The outlet of the fluid pump is connected to a 3-way valve which has a dispense outlet connected to a dispense nozzle and a by-pass outlet connected to a recirculation fluid line. Either one motor may drive all pumps or several pumps may be driven by a single motor through a common drive mechanism or each pump may be driven by an individual motor. When an amount of colorant is dispensed, the motor drives the pumps and the 3-way valve for the particular colorant is opened to allow the colorant to be dispensed through the nozzle. The time period that the valve remains open determines the amount of colorant dispensed. The other 3-way valves, which are all being simultaneously driven by the motor, are in a by-pass mode so that the colorant recirculates back into its container rather than being undesirably dispensed.

However, existing colorant dispensing equipment can be improved. The colorant dispensing equipment utilizes a 3-way valve for each colorant container, which increases the equipment costs and manufacturing costs. Also, the plurality of 3-way valves tend to be a significant source of maintenance and service problems. Furthermore, the accuracy of the amount of colorant dispensed using the pump and valve arrangement can be improved. Also, a by-pass colorant flow path is needed because the single motor simultaneously operates all of the pumps. It is desired to more accurately control the amount of colorant dispensed so that the resulting paint color for any particular formula is consistent. Greater accuracy and control over the colorant dispensing process provides greater consistency in paint color for any given formula.

One paint colorant dispenser according to the present invention utilizes a nutating pump and a computer control system to control the pump. Nutating pumps have a piston which is positioned inside of a housing having a fluid inlet and a fluid outlet. The piston simultaneously slides axially and rotates inside of the housing. Existing nutating pumps have been operated by rotating the piston through a full 360° rotation and corresponding linear travel of the piston. Such piston operation results in a specific amount of fluid pumped by the nutating pump with each revolution. Accordingly, the amount of fluid pumped for any given nutating pump is limited to multiples of the specific volume. If a smaller volume of fluid is desired, then a smaller sized nutating pump is used or manual calibration adjustments are made to the pump. For example, in paint coloranting a minimum dispense can be about 1/256th of a fluid ounce. At such a small dispense, the motor would have had to run at excessive speeds to dispense larger volumes of colorant (multiple fall revolutions) in an appropriate time period. In order to minimize the dispense motor speed, a partial-revolution dispense for a larger capacity nutating pump would be advantageous. However, using a partial revolution to accurately dispense fluid is difficult due to the non-linear output of the nutating pump dispense profile vs. angle of rotation. Accordingly, needs exist to automatically control and vary the volume amount of fluid pumped by nutating pumps.

SUMMARY OF THE INVENTION

The present invention provides new colorant dispensers which accurately, consistently, and effectively dispense fluid. The invention is described as embodied in a paint colorant dispenser; however, the invention can be utilized to dispense any desired fluid. For example, the fluid dispensers can be used to dispense pharmaceuticals, cosmetics, inks, and other fluids at controlled volumes.

The paint colorant dispenser has a computer control system which operates a stepper motor or other incrementally controlled drive that drives a valveless pump, such as a nutating pump. Paint color formulas are stored in the computer control system and selected by an operator to mix a desired color of paint. The nutating pump pumps colorant from a bulk container to a dispense nozzle based on signals sent by the computer control system according to the paint color formula. The computer control system operates the stepper motor and the nutating pump such that the pump piston rotates less than a full 360° revolution for each step of the stepper motor. For example, 400 steps may be required for one full 360° revolution. The stepper motor and the nutating pump are rotated through a desired number of steps to dispense a desired amount of fluid.

The fluid dispense system having the nutating pump and computer control system accurately dispenses both large and small quantities of fluid. The computer control system controls the stepper motor and nutating pump to dispense a predetermined amount of fluid by dividing one full 360° pump piston revolution into several partial dispenses or segments.

The nutating pump of the present invention can be adjustable. For example, the angle between the axis of the nutating pump piston and the axis of the stepper motor shaft can be adjusted by an actuator. The computer control system sends signals to the actuator to operate the actuator which positions the nutating pump piston at a desired angle. The automated nutating pump angle adjustment effectively adjusts the pump fluid output through computer control.

Another nutating pump adjustment also provides for changing the pump fluid output. In this adjustment, the distance that a spherical bearing is off-set from the stepper motor shaft can be varied. The bearing off-set adjustment alters the fluid output of the nutating pump, and can be used to calibrate the pump, for example.

Various advantages of the present invention can become apparent upon reading this disclosure including the appended claims with reference to the accompanying drawings. The advantages may be desired, but not necessarily required to practice the present invention.

BRIEF DESCRIPTION OF THE DRAWINGS

FIG. 1 is a perspective, partial cut-away view of a fluid dispense system according to the principles of the present invention.

FIG. 2 is an enlarged perspective view of a portion of the fluid dispense system of FIG. 1.

FIG. 3 is a perspective, exploded view of a nutating pump of FIG. 2.

FIG. 4 is a perspective view of a position sensor according to the present invention.

FIG. 5 is graph of a dispense profile for a nutating pump according to the present invention.

FIG. 10 is a front elevational, partial cross-sectional view of a piston housing according to the present invention.

FIG. 11 is a top plan view of the piston housing of FIG. 10.

FIG. 12 is a left side view of the piston housing of FIG. 10.

FIG. 13 is a front elevational, partial cross-sectional view of another piston housing according to the present invention.

FIG. 14 is a top plan view of the piston housing of FIG. 13.

FIG. 15 is a left side view of the piston housing of FIG. 13.

DETAILED DESCRIPTION OF PRESENTLY PREFERRED EMBODIMENTS

Figure 6:
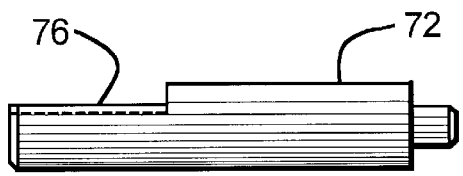
FIG. 6 is a front elevational view of a piston of the nutating pump of FIG. 3.
Figure 7:
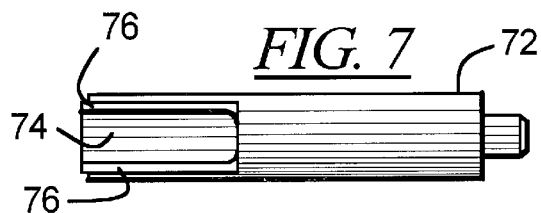
FIG. 7 is a top plan view of the piston of FIG. 6.
Figure 8:
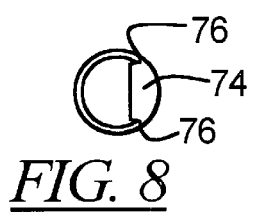
FIG. 8 is a left side view of the piston of FIG. 7.
Figure 9:
FIG. 9 is a right side view of the piston of FIG. 7.

Although the present invention can be made in many different forms, the presently preferred embodiments are described in this disclosure and shown in the attached drawings. This disclosure exemplifies the principles of the present invention and does not limit the broad aspects of the invention only to the illustrated embodiments.

A fluid dispense system 10 according to the present invention is shown in FIG. 1. The fluid dispense system 10 dispenses a variety of paint colorants from several colorant canisters 12 which hold bulk colorants. The fluid dispense system 10 has a computer control system 14 which stores the paint color formulas and operatively controls the fluid dispense system 10 to dispense the correct colorants and amounts of the colorants into a base paint, the coloranted paint is thoroughly mixed to produce the desired colored paint.

Referring to FIGS. 1 and 2, each colorant canister 12 is fluidly connected to an inlet to a fluid pump 16 by a tube 18. The embodiment of the present invention shown in FIGS. 1 and 2 includes a nutating pump as the fluid pump 16; however, other fluid pumps are contemplated by the invention. An outlet from the fluid pump 16 is fluidly connected to an inlet 20 to a dispense nozzle 22 by a delivery tube 24. A stepper motor 26 is linked to and drives the fluid pump 16. Although a stepper motor is described, those skilled in the art will recognize that other fine control drives may be utilized. The stepper motor 26 is operatively/electrically connected to and controlled by the computer control system 14. The nutating pump 16 functions both as a fluid pump and as a valve, and thus, a separate valve is not required to dispense the colorants. In other words, the fluid dispense system 10 is a valveless system from the colorant canister 12 to the dispense nozzle 22.

An agitation motor 28 is connected to and drives an agitator 30 positioned inside of the colorant canister 12. The computer control system 14 operates the agitation motor 28 to drive the agitator 30 and maintain a consistent mix of the colorant in the colorant canister 12.

The dispense nozzle 22 has a plurality of inlets 20 in which each dispense nozzle inlet 20 is provided for a separate colorant. The dispense nozzle 22 has an outlet 32 which points downward and is above a roller shelf 34. An open can of base paint is placed on the roller shelf 34 underneath the dispense nozzle outlet 32 for dispensing the colorants into the base paint.

The nutating pump 16 is shown in greater detail in FIG. 3. A piston 34 axially reciprocates an rotates inside of a liner 36. The liner 36 is contained within a housing 38 by a nut 40 and a seal 42. The piston 34 has a pin 44 engaged with a spherical bearing 46 which is held by a rotatable sleeve 48. The sleeve 48 is mounted to and rotatably driven by a shaft of the stepper motor 26. The stepper motor 26 and these components are mounted to a bracket 50.

The sleeve 48 has a sensor projection 52 which allows for determination of the rotational position of the stepper motor 26 and the piston 34. As one alternative to the sensor projection 52, a sensor wheel 54 can be provided on the shaft 56 of the stepper motor 26. A home sensor 58 is positioned such that it can sense the position of the senor wheel 54. For example, the home sensor 58 can be a photo-sensor which has a light beam that is interrupted by the sensor wheel 54 depending on the angular position of the sensor wheel 54. The home sensor 58 is electronically connected to the computer control system 14 of the fluid dispense system 10 by a wire 60. The sensor wheel 54 and the home sensor 58 combine to form a position sensor 62 which provides a signal to the computer control system 14 indicative of the rotational position of the stepper motor 26 and the piston 34 of the nutating pump 16. It will be understood by those in the art that many different types of position sensors may be employed for determining and controlling stepper motor position, for example, the sensor 58 could be a hall effect switch.

The embodiment of the position sensor 62 shown in FIG. 4 senses the angular position of the shaft 56 each time the leading edge 64 of the sensor wheel 54 rotates and breaks the light beam. The position of the leading edge 64 breaking the light beam and tripping the home sensor 58 defines the "home position" of the nutating pump 16, i.e. the home position of the piston 34 in the liner 36. The home position of the nutating pump 16 is defined axial and rotational position of the piston 34 in the liner 36. When the light beam is broken by the leading edge 64 of the sensor wheel 54, the home sensor 58 sends a signal indicative of the home position to the computer control system 14. The computer control system 14 determines when the nutating pump 16 is in the home position. The home position can be set at any desired position of the nutating pump 16; however, a convenient position may be top dead center or bottom dead center of the piston 34 in the liner 36.

The computer control system 14 can determine the position of the nutating pump 16 (axial and rotational positions of the piston 34) at any time, e.g. continuously tracks the nutating pump position. The position of the nutating pump 16 is determined by starting with the home position—which is a known position—and adding the amount of rotation imparted on the piston 34 by the stepper motor 26. As the stepper motor 26 rotates the sensor wheel 54, the next time the leading edge 64 trips the home sensor 58 the computer control system resets the computer stored position of the nutating pump 16 at the home position.

The home sensor 58 in the embodiment shown in FIG. 4 is a single position sensor, i.e. it only senses the home position. However, other position sensors could be utilized which can sense various positions of the shaft 56 of the nutating pump 16.

Stepper motors are well known and can be precisely controlled. Thus, the computer control system 14 can very accurately determine, track, and control the positions of the nutating pump 16. The nutating pump 16 is highly accurate and consistent fluid pump. Accordingly, the computer control system 14, the stepper motor 26, and the nutating pump 16 accurately and consistently pump a precise amount of colorant from a given colorant canister 12.

Operation of the nutating pump 16 will now be described assuming that the home position is defined as the piston 34 being slid the furthest distance into the liner 36 (top dead center) and the pump chamber inside the liner 36 is "empty" of colorant. The computer control system 14 sends a signal to the stepper motor 26 to rotate 180° (bottom dead center) which rotates the piston 34 180° and fills the pump chamber inside the liner 36 with colorant through a pump inlet 66. Colorant is dispensed by the computer control system 14 sending another signal to the stepper motor 26 to rotate through a predetermined number of steps. The piston 34 rotates and slide into the liner 36 and colorant is pumped out of a pump outlet 68 and to the dispense nozzle 22.

The amount of colorant that is dispensed depends on the number of steps rotated by the stepper motor 26 and the corresponding movement of the piston 34 in the nutating pump 16. The nutating pump 16 has a on-linear output. The output of one revolution can be graphed as 180° of a sinusoidal pattern of displacement per step of the stepper motor, and as a function of the rotational position.

For example, the curve in FIG. 5 represents the dispense profile of the nutating pump 16 versus angle of rotation of the associated stepper motor shaft 56 through 180° revolution of dispense. The area under the curve is broken into eight approximately equal segments in the FIG. 5 graph which represent equal amounts of fluid dispense. The area under the curve could be broken into other segments, as desired. By keeping track of angle rotation of the stepper motor 16 with the position sensor 62 and the computer control system 16, the rotation of the motor shaft 56 can be stopped at a point that will result in an accurate fraction (e.g., ⅛th) of the full-rotation dispense of the attached nutating pump 16.

In a preferred embodiment, the stepper motor 26 is used for the motor that drives the nutating pump 16. Stepper motors have their full rotation broken into a plurality of discreet segments, called steps. In preferred embodiments stepper motors 26 with 200 steps and 400 steps can be used. Additionally, electronic control devices can break the steps into smaller, partial steps by careful control of the motor windings (a process known as half stepping, or also microstepping). In this way, within appropriate torque limits, the rotation of the stepper motor can be accurately determined without feedback by keeping track of how far the motor has been driven around its rotation.

In order to accurately synchronize the motor shaft 56 position to the output profile (FIG. 5) of the pump 16, the home sensor 58 (FIG. 4) can be used. The home sensor 58 sends a signal to the computer control system 14 when the stepper motor 26 has reached an arbitrary zero point (the home position). The computer control system 14 counts the number of steps or microsteps the stepper motor 26 rotates past the home position.

In operation of the fluid dispense system 10, an operator places a can of base paint under the dispense nozzle 22, and selects the desired paint color formula using the computer control system 14. The computer control system 14 uses the color formula to determine the number of dispense segments required according to the dispense profile graph in FIG. 5. The dispense segments correspond to the equal, fractional dispense volumes of a full rotation of the nutating pump 16.

The computer control system 14 sends a signal to the stepper motor 26 to begin stepping or microstepping. The computer control system 14 counts the number of steps or microsteps past the home position. As the stepper motor 26 rotates to the appropriate pre-identified angular position, the computer control system 14 determines that the volume of colorant corresponding to the dispense graph segments has been dispensed. One segment under the graph represents the minimum amount of colorant that can be dispensed. By accumulating the number of times the nutating pump 16 has dispensed the minimum (one segment, partial-rotation) dispense, the computer control system 14 can dispense various volumes of colorant which correspond to multiples of the minimum dispense. For example, one segment under the dispense graph profile can represent ¹⁄₂₅₆th of an ounce, ³⁄₂₅₆th of an ounce, or ¹³⁄₂₅₆th of an ounce, etc. For larger dispenses, the speed of the stepper motor 26 can be increased or decreased for higher or lower dispense speeds. Also, the computer control system 14 can count full dispense revolutions of the nutating pump 16 for larger volume fluid dispenses.

Given any particular stepper motor speed, this partial-rotation of the nutating pump 16 method can dispense fluid accurately and quickly for any desired dispense volume. For example, for any given volume of fluid dispense, the fluid dispense system 10 using partial revolutions of the nutating pump 16 can dispense fluid significantly faster than a similar pump having a smaller volume dispense per revolution which must rotate multiple full revolutions.

Another embodiment of the fluid dispense system 10 has a lookup table in the computer control system 14 which has the fluid volume dispensed per each step in the stepper motor revolution. After the operator selects the paint colorant formula, the computer control system 14 determines the dispense quantity for each colorant. A signal is sent from the computer control system 14 to the stepper motor 16 to initiate a particular colorant dispense quantity. The per step volume is added to an accumulator in the computer control system 14 as the stepper motor 16 rotates. The computer control system 14 rotates the stepper motor 16 until the accumulator equals or exceeds the desired dispense volume. In this way, any quantity of fluid can be dispensed based upon the lookup table to at least the accuracy of the largest step size.

Also, since many pumps have slip which changes with pump speed. The computer control system 14 can multiply the per step volume by a speed-based correction factor before the per step volume is added to the accumulator. Thus, the fluid dispense system 10 can compensate for speed-varying pump slip.

The volume of fluid dispensed from the nutating pump 16 with a spherical bearing drive 46 can be defined as follows.

The axial stroke length of the piston 34 is defined as:

$$L = \sin(\phi) * 2 * R$$

Where:

ϕ = angle of motor shaft with respect to pump cylinder axis (where 0° is defined as coincident)
R = radius of center of the spherical bearing
L = resulting piston stroke length.

The axial displacement of the piston 34 as a function of stepper motor rotational angle is defined by the following equation:

$$X = L * \{(\cos(\theta_1) - \cos(\theta_2)\}$$

Where:

X = resulting linear displacement of piston
$\theta_1$ = starting rotational angle (0° is defined as bottom dead center, the angle increasing as piston moves up)
$\theta_2$ = ending rotational angle (0° is defined as bottom dead center, the angle increasing as piston moves up).

Because at the bottom of the piston stroke $\theta_1 = 0$, the total axial displacement of the piston 34 for displacement from the bottom of the piston stroke is defined by the following equation:

$$X = L * \{1 - \cos(\theta_2)\}.$$

This equation can be translated into steps of the stepper motor 26, for example:

$$X = L * \{1 - \cos([N/Nmax] * 360°)\}$$

Where:

N = the number of motor steps from bottom dead center
Nmax = the total number of motor steps for one revolution
X = resulting linear displacement from bottom dead center.

The piston diameter, angle between the motor and cylinder, bearing radius, and starting/ending rotational angles can be combined into a single equation:

Volume displacement = $\{\sin(\phi) * 2 * R\} * \{(\cos(\theta_1) - \cos(\theta_2)\} *$ (Diameter of piston)$^2$ * pi/4.

The rotational angles and displacement pertain to the first ½-revolution following bottom dead center, which is the dispense portion of a full revolution cycle. The second ½-revolution is the intake portion of the cycle. Because the intake portion of the cycle does not dispense fluid, the displacement/rotational angle relationship is not addressed. Of course, the second half (intake portion) of the cycle must take place prior to the beginning of the next cycle, so that the piston is fill of fluid.

The following formulas and tables demonstrate examples of determining how many stepper motor steps are required for stepping through each segment under the dispense graph curve of FIG. 5. These examples assume that 200 steps (400 half steps) are required for one fall 360° rotation. Because dispensing occurs only during 180° rotation (fluid intake occurs during other 180° rotation), 100 steps (200 half steps) will dispense the full volume of fluid during one complete pump cycle. Half steps are more desirable because of the smaller volume amount of dispense that can be controlled. Most of these examples assume that one full dispense cycle is equal to $\frac{1}{32}^{nd}$ oz. Accordingly, if the dispense cycle is dived into 24 equal segments, then each segment represents 768ths oz.; 12 segments equals 384ths oz.; 8 segments equals 256ths oz.; etc.

The segment calculations for the nutating pump sine curve is defined by the following formula, assuming each segment is $\frac{1}{24}^{th}$ of the dispense portion of the cycle, i.e. each segment is $\frac{1}{24}^{th}$ of the 180° dispense rotation.

$$1 - \cos(x) = 2 * n/24$$

Where n = 1, 2, 3 . . . 24

Solving for x:

$$x = \text{Arc } \cos(1 - n/12)$$

Where n = 1, 2, 3 . . . 24

The number of half steps (y) are defined by the following equation:

$$y = x * 200/180° \text{ (where y = number of ½steps)}$$

The calculated half steps are rounded to the nearest whole half step to result in the number of rounded half steps (R.S.) required for each segment under the dispense graph. The results are shown in the 768ths oz. per step table. The above calculations are repeated for segmenting the dispense graph into different numbers of segments and amounts of dispense per half step.

| N | x(n) | 768ths oz y(n) | Rnd | 384ths oz y(n) | Rnd | 256ths oz y(n) | Rnd | 192nds oz y(n) | Rnd | 128ths oz y(n) | Rnd | 64ths oz Rnd | 1/48ths oz Y(n) Steps | R. S. |
|---|---|---|---|---|---|---|---|---|---|---|---|---|---|---|
| 1 | 23.55646 | 26.174 | 26 | 37.286 | 37 | 46.01 | 46 | 53.5441 | 53 | 66.67 | 67 | 100 | 121.64 | 122 |
| 2 | 33.55731 | 37.286 | 37 | 53.544 | 53 | 66.67 | 67 | 78.3653 | 78 | 100 | 100 | 200 | 478.37 | 478 |
| 3 | 41.40962 | 46.011 | 46 | 66.667 | 66 | 83.91 | 84 | 100 | 100 | 133.3 | 133 | | 600 | 600 |
| 4 | 48.18969 | 53.544 | 54 | 78.365 | 78 | 100 | 100 | 121.635 | 122 | 200 | 200 | | | |
| 5 | 54.31467 | 60.35 | 61 | 89.34 | 89 | 116.1 | 116 | 146.456 | 147 | | | | | |
| 6 | 60 | 66.667 | 67 | 100 | 100 | 133.3 | 133 | 200 | 200 | | | | | |
| 7 | 65.37568 | 72.64 | 73 | 110.66 | 111 | 154 | 154 | | | | | | | |
| 8 | 70.52878 | 78.365 | 79 | 121.63 | 122 | 200 | 200 | | | | | | | |
| 9 | 75.52249 | 83.914 | 85 | 133.33 | 134 | | | | | | | | | |
| 10 | 80.40593 | 89.34 | 90 | 146.46 | 147 | | | | | | | | | |
| 11 | 85.21981 | 94.689 | 95 | 162.71 | 163 | | | | | | | | | |
| 12 | 90 | 100 | 100 | 200 | 200 | | | | | | | | | |
| 13 | 94.78019 | 105.31 | 105 | | | | | | | | | | | |
| 14 | 99.59407 | 110.66 | 110 | | | | | | | | | | | |

-continued

| N | x(n) | 768ths oz y(n) | Rnd | 384ths oz y(n) | Rnd | 256ths oz y(n) | Rnd | 192nds oz y(n) | Rnd | 128ths oz y(n) | Rnd | 64ths oz Rnd | 1/48ths oz Y(n) Steps | R. S. |
|---|---|---|---|---|---|---|---|---|---|---|---|---|---|---|
| 15 | 104.4775 | 116.09 | 115 | | | | | | | | | | | |
| 16 | 109.4712 | 121.63 | 121 | | | | | | | | | | | |
| 17 | 114.6243 | 127.36 | 127 | | | | | | | | | | | |
| 18 | 120 | 133.33 | 133 | | | | | | | | | | | |
| 19 | 125.6853 | 139.65 | 139 | | | | | | | | | | | |
| 20 | 131.8103 | 146.46 | 146 | | | | | | | | | | | |
| 21 | 138.5904 | 153.99 | 154 | | | | | | | | | | | |
| 22 | 146.4427 | 162.71 | 163 | | | | | | | | | | | |
| 23 | 156.4435 | 173.83 | 174 | | | | | | | | | | | |
| 24 | 180 | 200 | 200 | | | | | | | | | | | |
| x | | | | | | | | | | | | | 800 | 800 |

½-step rounding error calculations:
$1/128$th oz shots: Step rounding error = 0.333/33.33*100 = 1%.
$1/192$nd oz shots: Step rounding error = 0.365/21.635*100 = 1.69%
$1/256$th oz shots: Step rounding error = 0.244/17.244*100 = 1.4%
$1/384$th oz shots: Step rounding error = 0.34/10.66*100 = 3.19%

Referring to FIG. 3, the piston 34 has a flat notched portion 70 which is typical for nutating pumps. Another embodiment of a cylindrical piston 72 is shown in FIGS. 6–9. At the flat notched portion 70, the piston 72 has a recessed portion 74 extending into the piston 72 from outer edges 76. The recessed portion 74 provides the nutating pump with a larger pocket for fluid to pass through than the flat portion 70 as the piston 72 moves axially back and forth. Thus, the piston 72 provides less fluid flow restriction. Because the outer edges 76 are at the same location as the flat portion 70 in the piston 34 (FIG. 3), the recessed portion 74 does not affect the open/close operation of the nutating pump 16 as the piston 72 rotates. The depth and shape of the recessed portion 74 can be varied as desired.

Another nutating pump housing 78 is shown in FIGS. 10–12. The housing 78 has a piston bore 80 for receiving the piston 34 (FIG. 3). The diameter of the piston bore 80 has a size such that an additional liner 36 is not needed. Caps (not shown) are mounted on the threaded ends 82 of the housing 78 to seal the piston 34 inside of the housing 78. A mounting portion 84 allows the housing 78 to be securely mounted to a support. Round inlet and outlet openings 86, 88 are provided to allow fluid to enter into and be pumped out of the housing 78. Inlet and outlet ports 90, 92 are fluidly connected to the inlet and outlet openings 86, 88, respectively. The inside diameters of the inlet and outlet ports 90, 92 are greater than the diameters of the inlet and outlet openings 86, 88 to reduce fluid flow restriction and allow for increased fluid flow.

Another nutating pump housing 94 is shown in FIGS. 13–15. The housing 94 has oval shaped inlet and outlet openings 96, 98. The oval shaped inlet and outlet openings 96, 98 provide larger openings for fluid flow which reduces flow restriction and increases fluid flow. The oval shaped openings 96, 98 are elongated in the longitudinal direction of the housing 94. The longitudinal elongation of the openings 96, 98 does not affect the opening and closing of the inlet and outlet openings 96, 98 as the piston 34 rotates and slides within the housing 94. Although oval shaped openings are shown other shapes of the openings can be utilized according to the invention.

Figure 16:
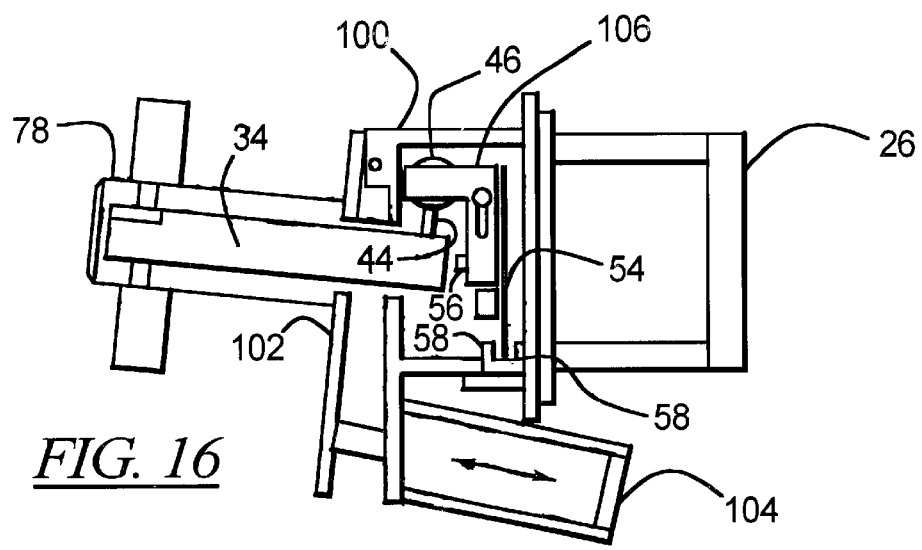
FIG. 16 is an elevational view of an adjustable nutating pump according to the present invention.
Figure 17:
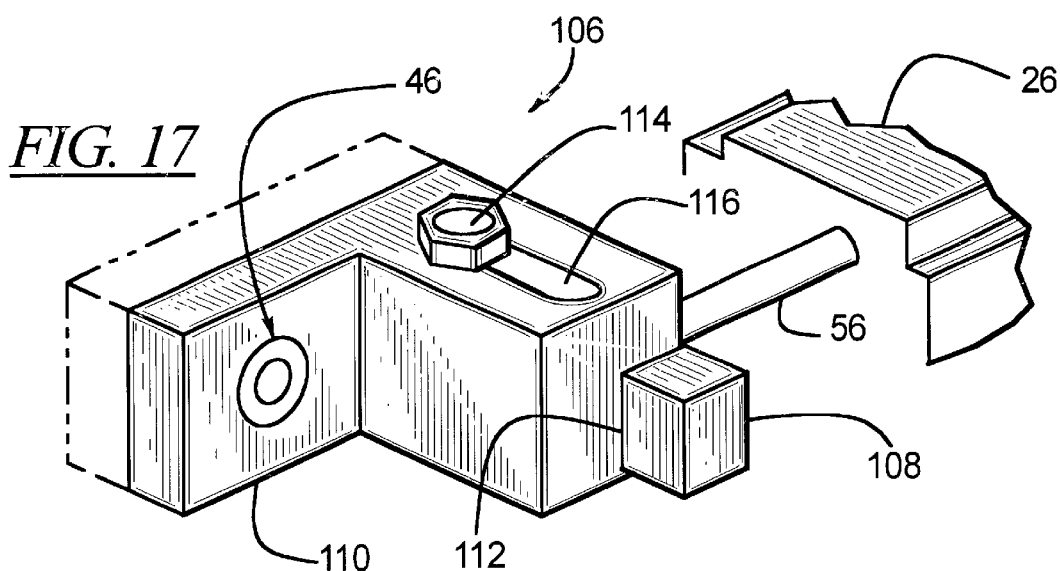
FIG. 17 is an enlarged partial perspective view of a piston driver of FIG. 16.

FIGS. 16 and 17 show two nutating pump adjustment mechanisms. Referring to FIG. 16, the first adjustment mechanism adjusts the angle between the shaft 56 of the stepper motor 26 and the longitudinal axis of the piston 34 and the housing 78. Adjusting the angle piston/stepper motor angle affects the output of the nutating pump. An angle adjuster bracket 100 is attached to the stepper motor 26 and has a hinged portion 102 mounted to the piston housing 78. An actuator 104 is mounted to the angle adjuster bracket 100 and is operatively engaged with the hinged portion 102 to pivot the housing 78 and piston 34 assembly, as desired. The spherical bearing 46, which is engaged with the piston 34 by the pin 44, allows the piston 34 to pivot relative to a piston driver 106, which is engaged with and rotated by the stepper motor shaft 56. The actuator is electrically connected to and controlled by the computer control system 14. Accordingly, the angle between the piston 34 and the motor shaft 56 is automatically controlled and manual adjustment of the angle is not required. Also, the output profile of the nutating pump is automatically controlled by the computer control system 14. Suitable actuators include solenoids, cams, stepper motors, linear actuators, and other actuators.

Referring to FIGS. 16 and 17, the second nutating pump adjustment mechanism adjusts the radial distance that the spherical bearing 46 is offset from the axis of the stepper motor shaft 56. By adjusting the spherical bearing/shaft offset the linear movement of the piston 34 sliding into and out of the housing 78 is increased or decreased, which affects the nutating pump output. In this manner, the output of the nutating pump can be adjusted as desired.

The piston driver 106 has a stationary member 108 fixed to the stepper motor shaft 56. An adjustable member 110 has a bore 112 which receives the stationary member 108 such that the adjustable member 110 slides relative to the stationary member 108. A lock screw 114 extends through an adjustment slot 116 and is engaged with the stationary member 108. The lock screw 114 is loosened to allow sliding of the adjustable member 110 relative to the stationary member 108, and then tightened to secure the stationary and adjustable members 108, 110 together. The adjustable member 110 carries the spherical bearing 46. As the adjustable member 110 is slid, the offset distance of the spherical bearing 46 relative to the stepper motor shaft 56 is adjusted as desired. By using a reverseable drive it is also possible to provide a slight draw-back at the end of any dispense. Due to the viscosity of the fluids being dispensed, a greater or lesser amount of fluid may remain at the dispense outlet opening in the form of a partial drop. This can allow a post dispense fluid drip to occur.

By partially reversing the drive after a dispense, the fluid forming at the dispense outlet opening can be drawn back.

Due to the very small increments of piston movement available utilizing the drive system described in this invention, it is possible to provide draw-back with a fine degree of control. For example, only ½ step may be sufficient for small dispense orifices.

Where desired, the draw-back reverse rotation can be retained in control or memory and provide an automatic adjustment for the next dispense operation. Such memory retention would be advantageous where a larger draw-back has been provided. For example, if a multi-step draw-back is used to assure no drip at the dispense orifice, this would indicate that the fluid remaining in the conduit from the pump to the dispense orifice is less than the volume of the tube after draw-back. This quantity can then be automatically added to the next dispense calculation.

While the presently preferred embodiments have been illustrated and described, numerous changes and modifications can be made without significantly departing from the spirit and scope of this invention. Therefore, the inventors intend that such changes and modifications are covered by the appended claims.

The invention is claimed as:

1. A fluid dispenser comprising:
a source of fluid;
a fluid pump having a rotating and reciprocating piston in a pump housing, the pump housing having an inlet fluidly connected to the source of fluid and an outlet;
a motor engaged with the fluid pump; and
a controller operatively connected to the motor the controller having a plurality of output signals, the motor and piston having predetermined rotational positions in response to the plurality of output signals, at least one rotational position of the piston being less than a full revolution of the piston.

2. The fluid dispenser of claim 1, wherein the fluid pump comprises a nutating pump and the motor comprises a stepper motor.

3. The fluid dispenser of claim 1, further comprising a dispense nozzle fluidly connected to the outlet of the fluid pump.

4. The fluid dispenser of claim 2, further comprising a position sensor located in sensing relationship to a rotational position of at least one of the nutating pump and the stepper motor.

5. The fluid dispenser of claim 4, wherein the position sensor further comprises:
a sensor wheel engaged to and rotatable with a shaft of the stepper motor; and
a sensor positioned in sensing relationship to the sensor wheel.

6. The fluid dispenser of claim 5, wherein the sensor has a light beam and the sensor wheel interrupts the light beam at a particular rotational position.

7. The fluid dispenser of claim 1, further comprising a position sensor located in sensing relationship to a rotational position of at least one of the piston and the motor, the position sensor having a signal received by the controller which is indicative of the rotational position of the at least one of the piston and the motor.

8. The fluid dispenser of claim 1, wherein the piston has a cylindrical shape and a notched area at one end, and a recessed portion extending inward into the piston from an outer edge of the notched area.

9. The fluid dispenser of claim 1, wherein at least one of the pump inlet and outlet has an elongated shape.

10. The fluid dispenser of claim 2, wherein the fluid pump is mounted to the stepper motor by an angle adjuster, and further comprising an actuator operatively connected to the angle adjuster, the controller having an angle output signal received by the actuator.

11. The fluid dispenser of claim 1, further comprising:
a radially adjustable piston driver engaged with a shaft of the motor; and
a spherical bearing carried by the piston driver and engaged with the piston.

12. The fluid dispenser of claim 2, further comprising:
a radially adjustable piston driver engaged with a shaft of the stepper motor; and
a spherical bearing carried by the piston driver and engaged with the piston.

* * * * *